May 7, 1957 W. MARITZ 2,791,354
DISPENSER
Filed Feb. 11, 1955
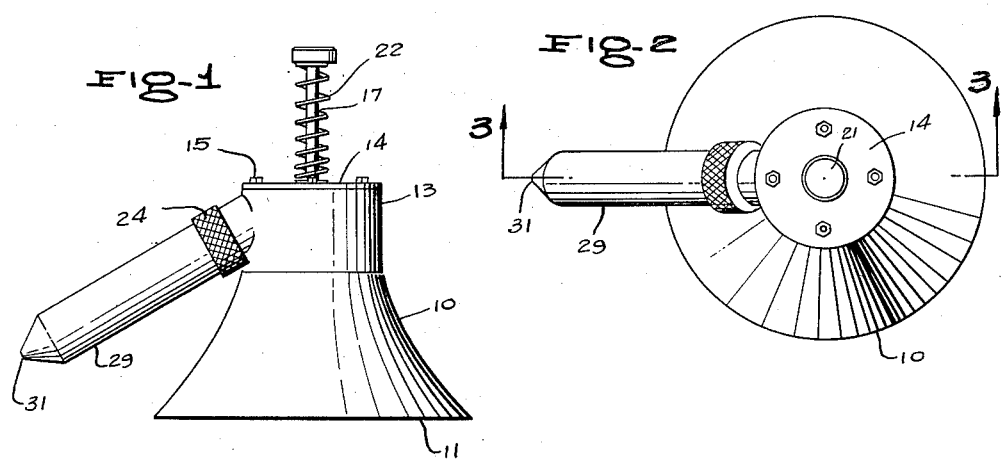
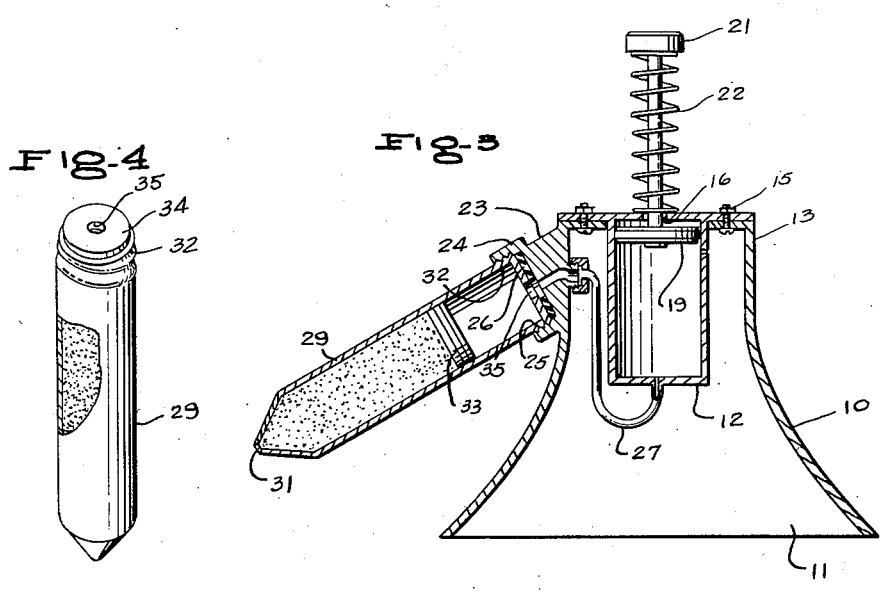
INVENTOR.
WERNER MARITZ
BY
McMorrow, Berman & Davidson
ATTORNEYS

United States Patent Office 2,791,354
Patented May 7, 1957

2,791,354
DISPENSER

Werner Maritz, New York, N. Y.

Application February 11, 1955, Serial No. 487,487

3 Claims. (Cl. 222—389)

The present invention relates generally to food dispensers and specifically to a table dispenser for semi-fluid foods or condiments such as mustard, catsup, and the like.

The present invention has for its principal object to provide a dispenser of a more or less upright design having a replaceable load of a semi-fluid food in a separate container, the dispenser being of the type that the container may be screwed to it and when the food is exhausted, a new and full container supplied.

Another object of the present invention is to provide a novel and attractive device for dispensing mustard mixtures or the like in a novel manner, and one which is suitable for restaurant use, the mustard being unexposed to the air or to insects, and being in a package as obtained from the food processer until the container is exhausted.

A further object of the present invention is to provide an inexpensively constructed device for dispensing such foods as mustard, salad dressing, catsup, and the like, and which has a separate and removable container for such foods which may be removed at closing hours and stored without danger of leakage in refrigerating rooms or containers, and which remains in the container until all used by the customers or diners.

A still further object of the present invention is to provide a neat package for the containing and retailing of such articles of commerce that are semi-fluid and include foods, pastes, marking inks, semi-solid cements and fillers, and other materials that are generally dispensed and used in a semi-fluid state, in normally small quantities.

These and other objects and advantages of the present invention will be more fully apparent from the following description when taken in connection with the annexed drawings, in which:

Figure 1 is a side view in elevation of the present invention,

Figure 2 is a top view of the invention,

Figure 3 is a side view in cross section as seen on line 3—3 of Figure 2, and

Figure 4 is a view in perspective of the container portion of the invention in shipping or storing condition.

Referring in more detail to the drawing, in which like numerals indicate like parts throughout the several views, the present invention is seen to consist of a generally curved conical body 10 open on its larger lower end 11 and being formed with a receptacle or cylinder 12 open on its smaller top end 13. A cover 14 closes the cylinder 12 and is secured to the body 10 by bolts 15, and a hole 16 permits the stem 17 of the plunger 18 which is within the receptacle and is movable upwardly and downwardly therein, the plunger having a pump washer 19 on the lower end and a button 21 on its upper end, with the spring 22 operatively connected to the stem 17 and normally returning the plunger 18 to its uppermost position.

The body 10 is formed on one side with an outwardly projecting hollow boss 23 which has a slightly enlarged end 24 with internal threads 25 and has an inserted washer 26 of rubber, cork, or other material inimical to the food or product to be dispensed. The boss 23 is connected by the tube 27 to the lower end of the cylinder 12.

The container portion of the invention comprises a more or less cylindrically shaped bottle 29 formed with a conical end 30 and a delivery opening 31 and a threaded other end 32 in which is slidable the somewhat thick piston 33. The end 32 of the bottle 29 is normally closed by the piston 33 in contact with the end wall 34 in which is an air inlet 35.

The battle 29 is meant to be filled with the commodity to be sold and dispensed at the factory and naturally, some means of closure for the delivery end is contemplated but not here illustrated, and may take the form of a cork, frangible plastic tip, plastic adhesive covering, or any other closure member as is desired. In normal usage, the mustard or other condiment is of such consistency that it will not flow readily from the delivery end of the bottle, and the piston is of such snug fit that it will remain in position in the bottle and will slide upwardly or downwardly as the case may be in response to air pressure as exerted through the tube from the cylinder. It is believed that no valve is needed for the readmission of air to the cylinder, there being provided space around the plunger stem for the air and the washer 19 may be of the one-way type that will not create substantial suction on its return stroke.

While a single embodiment of the present invention has been here illustrated and described, other embodiments of the invention are contemplated within the scope of the appended claims without departing from the spirit thereof.

What is claimed is:

1. A dispenser for semi-fluid materials comprising a substantially open ended conical body having a large open lower end and a smaller upper end, a vertically disposed receptacle having an open end positioned within said body so that the open end faces the upper end of said body and having the open end dependingly carried by the upper end of said body, a cover closing the open end of said receptacle, a plunger within and movable upwardly and downwardly in said receptacle, an upstanding stem extending through said cover and having the lower end attached to said cover and having a button on the upper end for application thereto of a force to effect the downwardly movement of the plunger, spring means operatively connected to said stem for urging said plunger toward the upwardly movement position, and outwardly projecting hollowed boss formed on said body on one side thereof, and a tube connecting said boss with said receptacle at the lower end thereof, said tube being adapted to convey air as forced by downward movement of said plunger, and a bottle detachably secured to said boss and being adapted and arranged to dispense material therefrom in response to air pressure in said tube.

2. A dispenser for semi-fluid materials comprising a substantially open ended conical body having a large open lower end and a smaller upper end, a vertically disposed receptacle having an open end positioned within said body so that the open end faces the upper end of said body and having the open end dependingly carrier by the upper end of said body, a cover closing the open end of said receptacle, a plunger within and movable upwardly and downwardly in said receptacle, an upstanding stem extending through said cover and having the lower end attached to said cover and having a button on the upper end for application thereto of a force to effect the downwardly movement of the plunger, spring means operatively connected to said stem for urging said plunger toward the upwardly movement position, and outwardly projecting hollowed boss formed on said body on one side thereof, and a tube connecting said boss with said receptacle at the lower end thereof, said tube being adapted to convey air as forced by downward movement of said plunger; and a container bottle adapted to be connected to said boss, said bottle having a delivery opening adapted to dispense semi-fluids to response to air presure in said tube.

3. A dispenser for semi-fluid materials comprising a substantially open ended conical body having a large open lower end and a smaller upper end, a vertically disposed receptacle having an open end positioned within said body so that the open end faces the upper end of said body and having the open end dependingly carried by the upper end of said body, a cover closing the open end of said receptacle, a plunger within and movable upwardly and downwardly in said receptacle, an upstanding stem extending through said cover and having the lower end attached to said cover and having a button on the upper end for application thereto of a force to effect the downwardly movement of the plunger, spring means operatively connected to said stem for urging said plunger toward the upwardly movement position, and outwardly projecting hollowed boss formed on said body on one side thereof, and a tube connecting said boss with said receptacle at the lower end thereof, said tube being adapted to convey air as forced by downward movement of said plunger; and a removable bottle adapted to contain a semi-fluid material, said bottle and said boss having matching connecting means, said bottle being formed with an air inlet at one end and a delivery opening at the other and having a free piston movable in response to air pressure in said inlet to press contained material toward said opening.

References Cited in the file of this patent

UNITED STATES PATENTS

| | | |
|---|---|---|
| 1,175,267 | Jacobs | Mar. 14, 1916 |
| 2,311,624 | Bobrick | Feb. 23, 1943 |
| 2,372,469 | Beasley | Mar. 27, 1945 |
| 2,650,744 | Dirksen | Sept. 1, 1953 |
| 2,659,517 | Reinhardt | Nov. 17, 1953 |

FOREIGN PATENTS

| | | |
|---|---|---|
| 462,807 | France | Dec. 1, 1913 |